United States Patent
Jin

(10) Patent No.: US 11,185,882 B2
(45) Date of Patent: Nov. 30, 2021

(54) SEALANT APPLYING DEVICE FOR APPLYING SEALANT IN VEHICLE BODY

(71) Applicants: Hyundai Motor Company, Seoul (KR); Kia Motors Corporation, Seoul (KR)

(72) Inventor: Taeheun Jin, Gyeongsan-Si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 133 days.

(21) Appl. No.: 16/657,311

(22) Filed: Oct. 18, 2019

(65) Prior Publication Data

US 2020/0179976 A1  Jun. 11, 2020

(30) Foreign Application Priority Data

Dec. 6, 2018 (KR) ........................ 10-2018-0155995

(51) Int. Cl.
| | |
|---|---|
| B05B 13/04 | (2006.01) |
| B05C 5/02 | (2006.01) |
| B05C 11/10 | (2006.01) |
| B25J 11/00 | (2006.01) |
| B05C 17/005 | (2006.01) |
| B25J 9/10 | (2006.01) |

(52) U.S. Cl.
CPC .... *B05C 17/00503* (2013.01); *B05B 13/0431* (2013.01); *B05C 5/0212* (2013.01); *B05C 5/0216* (2013.01); *B05C 11/1021* (2013.01); *B25J 9/1015* (2013.01); *B25J 11/00* (2013.01); *B25J 11/0075* (2013.01)

(58) Field of Classification Search
CPC ........................... B05C 5/0212; B05C 5/0216
See application file for complete search history.

(56) References Cited

U.S. PATENT DOCUMENTS

| | | | | |
|---|---|---|---|---|
| 4,577,499 A * | 3/1986 | Silke | ...................... | B23K 9/028 |
| | | | | 228/9 |
| 5,573,625 A * | 11/1996 | Lovell | .................. | B05C 5/0216 |
| | | | | 118/409 |
| 6,017,578 A * | 1/2000 | Trautmann | ............ | B05C 5/0216 |
| | | | | 118/323 |
| 6,368,408 B1 * | 4/2002 | Schuler | ............... | E06B 3/67321 |
| | | | | 118/316 |
| 6,494,245 B1 * | 12/2002 | Simone | ............... | E06B 3/67343 |
| | | | | 156/107 |
| 6,589,344 B2 * | 7/2003 | Cho | ........................ | B05B 15/68 |
| | | | | 118/323 |
| 6,660,087 B2 * | 12/2003 | Murakami | ............ | B05C 5/0216 |
| | | | | 118/323 |
| 2005/0056213 A1 * | 3/2005 | Iimori | .................. | B05C 5/0216 |
| | | | | 118/410 |

(Continued)

*Primary Examiner* — Binu Thomas
(74) *Attorney, Agent, or Firm* — Morgan, Lewis & Bockius LLP

(57) ABSTRACT

A sealant applying device for applying a sealant along a joint line formed on a panel joint, may include a nozzle device including a nozzle tip mounted through a fixing block to apply the sealant to the joint line, a guide unit mounted on one side of the fixing block adjacent to the nozzle tip and configured to be slidably movable along the joint line to guide the nozzle tip and a floating unit connected to the fixing block and a robot and allowing the fixing block to move upwards and downwards.

17 Claims, 6 Drawing Sheets

(56) References Cited

U.S. PATENT DOCUMENTS

| | | | | |
|---|---|---|---|---|
| 2009/0133620 A1* | 5/2009 | Osaki | ............... | B25J 17/0208 |
| | | | | 118/323 |
| 2009/0145699 A1* | 6/2009 | Jonsson | ............ | B25J 19/0004 |
| | | | | 188/1.11 L |
| 2010/0075058 A1* | 3/2010 | Rademacher | ........ | B05C 5/0216 |
| | | | | 427/427.3 |
| 2010/0251964 A1* | 10/2010 | Davis | ............... | B05C 5/0216 |
| | | | | 118/712 |
| 2018/0272373 A1* | 9/2018 | Pringle, IV | ........ | B05C 11/1007 |

* cited by examiner

SEALANT APPLYING DEVICE FOR APPLYING SEALANT IN VEHICLE BODY

CROSS-REFERENCE TO RELATED APPLICATION

The present application claims priority to Korean Patent Application No. 10-2018-0155995 filed on Dec. 6, 2018, the entire contents of which is incorporated herein for all purposes by this reference.

BACKGROUND OF THE INVENTION

Field of the Invention

The present invention relates to a sealant applying device. More particularly, the present invention relates to a sealant applying device applied to a sealant applying process of a vehicle body.

Description of Related Art

In general, vehicle panel joints are treated with sealant in the paint process to maintain air-tightness and water-tightness.

The paint process of the vehicle body includes a process for applying sealant, deadener, and RPP (Rocker Panel Primer) to the vehicle body.

The sealant applying process is to apply sealant to the joints between the panels such as the door, side outers, fenders, loops, hoods, trunk lid, etc. of the vehicle body to prevent external dust and various materials from penetrating through the joints of the panels, and to improve the water-tightness, rust prevention and noise prevention of the vehicle body.

In the conventional sealant applying process, the sealant in the drum is pumped by a pump unit, the flow rate and pressure are regulated in a supply unit, and the sealant is injected into the vehicle body through a sealant gun.

However, according to the conventional art, the sealant applying device is applied to the vehicle body with a non-uniform thickness as the sealant is sprayed through the sealant gun, causing deformation and bending of the shell of the vehicle body, and causing quality problems in the body.

To prevent this, an operator may manually apply the sealant, which increases the labor cost and causes the vehicle body quality to vary depending on the operator's ability.

Furthermore, conventional art requires additional manual work to maintain a consistent application pattern of sealant, so that workability and productivity are deteriorated The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a sealant applying device configured for applying a sealant at a precise location along a joint line.

According to an exemplary embodiment of the present invention, a sealant applying device configured for applying a sealant along a joint line formed on a vehicle panel joint may include a nozzle device including a nozzle tip mounted through a fixing block to apply the sealant to the joint line, a guide unit mounted on one side of the fixing block adjacent to the nozzle tip and configured to be slidably movable along the joint line to guide the nozzle tip and a floating unit connected to the fixing block and a robot and allowing the fixing block to move upwards and downwards.

The sealant applying device may further include a driving unit configured to be connected to an arm of the robot, of which the floating unit is mounted thereto, and selectively rotating the floating unit so that the nozzle device is in close contact with the joint line.

The driving unit may include a drive motor mounted within a driving bracket configured to be connected to the arm of the robot, a driving rod rotatably mounted within the driving bracket through a bearing and located between the drive motor and the floating unit to selectively transmit a torque of the drive motor to the floating unit and a driving brake mounted within the driving bracket and selectively locking the driving rod.

The drive motor may be a servo motor.

The driving unit may further include a torsion spring connected to the driving rod and the driving bracket to provide a restoring force on the driving rod.

A friction plate may be connected to the driving rod, and the driving brake may include a driving stopper which is selectively protruded towards the friction plate to contact with the friction plate.

The nozzle tip may be connected to the fixing block which is slanted to the joint line.

The nozzle device may further include a sealant valve which is connected to the nozzle tip via a nozzle tube and supplies the sealant to the nozzle tip The guide unit may include a guide pin mounted through a groove formed in the slanted surface of the fixing block and slanted toward an end portion of the nozzle tip and a fixing bracket fixing the guide pin to the fixing block.

The guide unit may include a guide column mounted on one side of the fixing block and configured to contact with the joint line, a guide block into which the guide column is fitted and a roller mounted at the bottom portion of the guide block and configured for rolling along the joint line.

The roller may be rotatably coupled through a shaft inside the guide block.

The guide unit may be located forward of the nozzle tip relative to an operation direction in which the sealant is applied along the joint line.

The floating unit may be connected to the top portion of the fixing block and guides the movement of the fixing block in the upward and downward directions thereof.

The floating unit may include a housing, a moving bracket that is movably mounted within the housing and connected to the fixing block, a fixing member mounted on the housing, a guide rod connected to the moving bracket and movably inserted into the fixing member and a spring mounted between the moving bracket and the fixing member.

The moving bracket may include a top plate connected to the guide rod, a bottom plate connected to the guide rod and a side plate connecting the top portion plate and the bottom plate and to which a slot is formed, and wherein the floating unit may further include a floating brake that selectively restricts movement of the moving bracket.

The floating brake may include a floating stopper which is inserted into the slot and selectively protruded to contact with the moving bracket to limit the movement of the moving bracket.

An exemplary embodiment of the present invention can apply a sealant uniformly to precise location along a joint line by applying a sealant while applying a driving unit that rotates a floating unit to press a guide unit to an edge portion of a joint line.

Furthermore, an exemplary embodiment of the present invention can adjust the gap between a panel and the nozzle tip by applying a guide unit so that the application pattern (eq. thickness, width, amount) of the sealant may be maintained constantly.

Furthermore, effects obtainable or predicted by the exemplary embodiments of the present invention will be directly or implicitly included in the detailed description of the exemplary embodiments of the present invention. That is, various effects to be predicted according to the exemplary embodiment of the present invention will be included in the detailed description to be described later.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
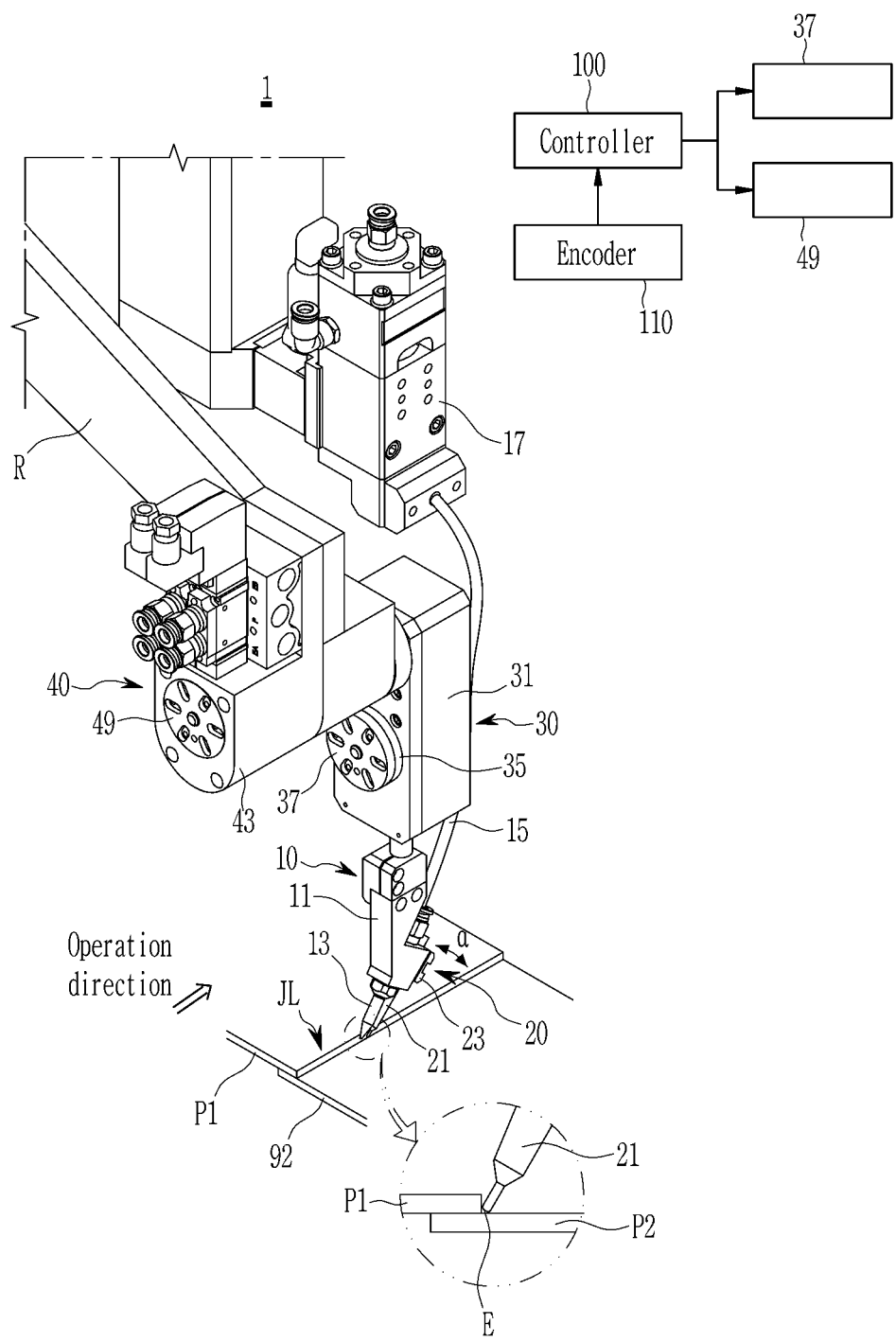
FIG. 1 is a perspective view of a sealant applying device according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Exemplary embodiments of the present application will be described more fully hereinafter with reference to the accompanying drawings, in which exemplary embodiments of the present invention are shown. As those skilled in the art would realize, the described embodiments may be modified in various different ways, all without departing from the spirit or scope of the present invention.

The drawings and descriptions are to be regarded as illustrative in nature and not restrictive. Throughout the specification, the same reference numeral applies to the same or similar constituent elements.

Figure 2:
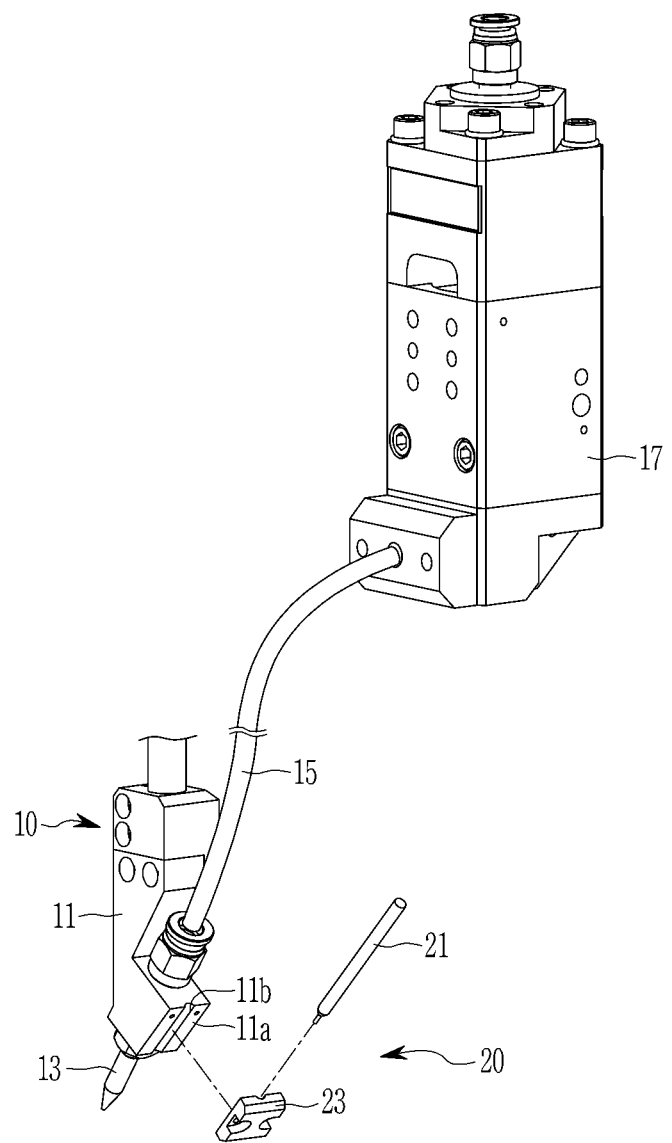
FIG. 2 is a perspective view of a nozzle device applied to a sealant applying device according to an exemplary embodiment of the present invention.

FIG. 1 is a perspective view of a sealant applying device according to an exemplary embodiment of the present invention and FIG. 2 is a perspective view of a nozzle device applied to a sealant applying device according to an exemplary embodiment of the present invention.

Figure 3:
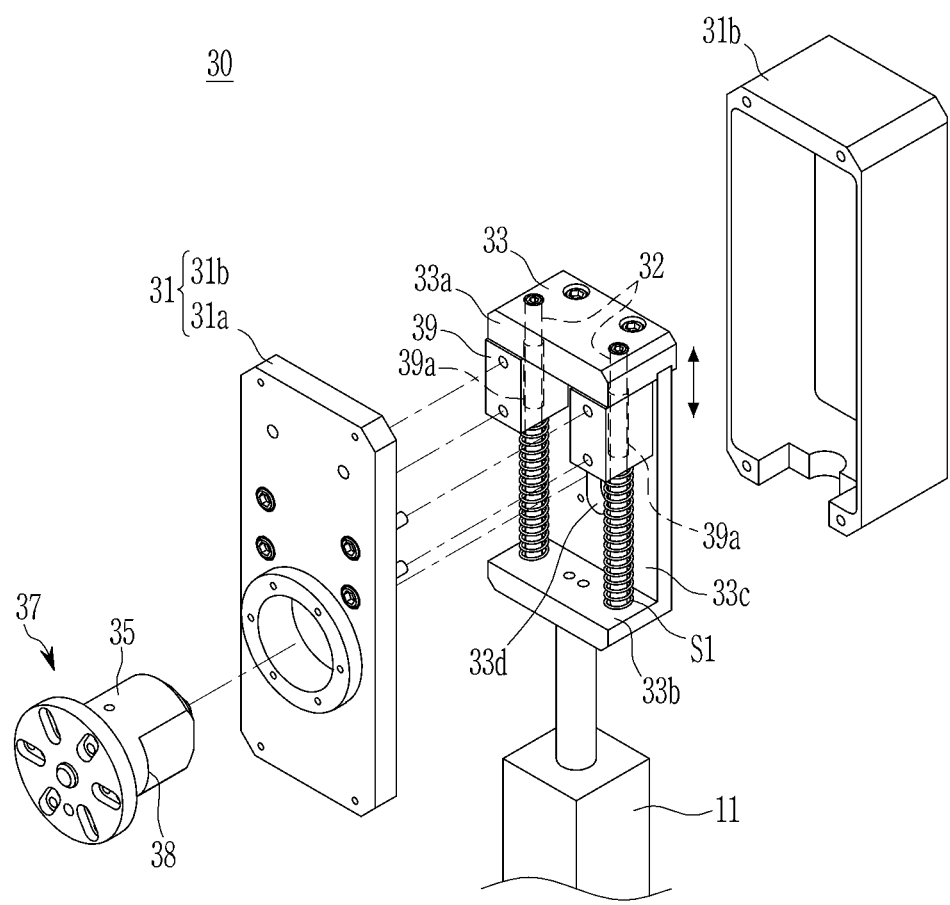
FIG. 3 is an exploded perspective view of a floating unit applied to a sealant applying device according to an exemplary embodiment of the present invention.
Figure 4:
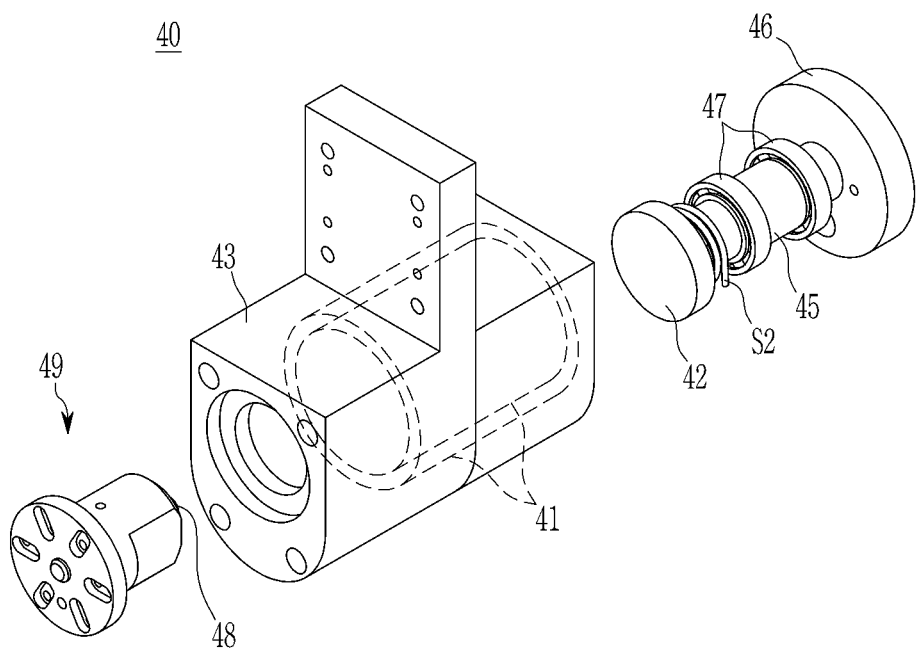
FIG. 4 is an exploded perspective view of a driving unit applied to a sealant applying device according to an exemplary embodiment of the present invention.

FIG. 3 is an exploded perspective view of a floating unit applied to a sealant applying device according to an exemplary embodiment of the present invention and FIG. 4 is an exploded perspective view of a driving unit applied to a sealant applying device according to an exemplary embodiment of the present invention.

Referring to FIG. 1, FIG. 2, FIG. 3, and FIG. 4, a sealant applying device 1 according to an exemplary embodiment of the present invention is applied to a sealant applying process that applies a sealant to the door, side outers, fenders, loops and trunk lid and the like of a vehicle body.

The sealant applying device 1 is to apply a sealant along a joint line JL between panels P1 and P2 of the vehicle body.

The vehicle body panels P1 and P2 are overlapped on the joint line JL to form an edge portion E.

The sealant applying device 1 may apply sealant to the edge portion E along the joint line JL.

The sealant applying device includes a nozzle device 10, a guide unit 20, a floating unit 30 and a driving unit 40.

The nozzle device 10 includes a fixing block 11, a nozzle tip 13 and a sealant valve 17.

The fixing block is slanted to the joint line JL.

For example, the fixing block 11 is formed with a slanted surface 11a located at a forward position with respect to a traveling or operation direction thereof.

A nozzle tip 13 is fitted at an end portion of the fixing block 11.

The nozzle tip 13 is fitted to the fixing block 11 and is mounted obliquely along the slanted surface 11a.

For example, the nozzle tip 13 is mounted at an acute angle to the joint line JL based on the direction of travel.

This nozzle tip 13 is connected to a nozzle tube 15 which is mounted through the fixing block 11.

The nozzle valve 17 is connected to nozzle tube 15 to supply sealant to the nozzle tip 13.

The nozzle valve 17 is a valve for controlling the sealant supply stored in the sealant tank.

The nozzle valve 17 is opened or closed to supply the sealant to the nozzle tip 13 according to a control of a controller 100

The guide unit 20 is positioned in front of the nozzle tip 13 with respect to an operation direction to guide the nozzle tip 13 along the joint line JL.

The guide unit 20 includes a guide pin 21 and a fixing bracket 23.

The guide pin 21 is mounted through a guide groove 11b formed on the slanted surface 11a of the fixing block 11.

The guide pin 21 is disposed obliquely toward the nozzle tip 13.

That is, the guide pin 21 is mounted in the same direction as the nozzle tip 13 and is mounted to form an acute angle α with the joint line JL based on an operation direction thereof.

Furthermore, the guide pin 21 has a pointed shape with its tip end portion as a whole, and its distal end portion is rounded.

This is to form a soft contacting surface when contacting the joint line JL.

Also, the guide pin 21 may have a circular cross section or a polygon cross section.

The guide pin 21 is mounted on the fixing block 11 through a fixing bracket 23.

The fixing bracket 23 may be bolted to the fixing block 11.

Referring to FIG. 1 and FIG. 3, the floating unit 30 is located at the top portion of the fixing block 11.

The floating unit 30 is for guiding the movement of the nozzle device 10 and the guide unit 20 in the upward and downward directions.

The floating unit 30 is connected to the robot arm R.

The floating unit 30 includes a housing 31 (31a and 31b), a moving bracket 33, a spring S1, a fixed member 39, a guide rod 32, and a floating brake 37.

The moving bracket 33 is mounted in the housing 31a and 31b to be movable upwards and downwards.

The fixing member 39 is mounted on the housing 31a, and the guide rod 32 is inserted into a hole 39a of the fixed member 39 to be movable relative to the housing 31a. The guide rod 32 is connected to the moving bracket 33.

The moving bracket 33 includes a top plate 33a, a bottom plate 33b and a side plate 33c connecting the top portion plate 33a and the bottom plate 33b and of which a slot 33d is formed thereto.

The guide rod 32 is coupled with the top portion plate 33a and the bottom plate 33b.

The guide rod 32 is inserted into the spring S1, and the spring S1 provides a restoring force between the fixing member 39 and the bottom plate 33b.

The fixing block 11 is connected to the moving bracket 33.

The floating brake 37 includes a floating stopper 35 which may be selectively protruded. For example, the floating brake 37 is a pneumatic cylinder type, selectively exerting the floating stopper 35. The configuration for transmitting the air pressure to the floating brake 37 is obvious to those skilled in the art and a detailed description thereof will be omitted.

The floating stopper 35 is inserted into the slot 33d formed on the side plate 33c which allows the upward and downward movement of the moving bracket 33.

When applying the sealant through the nozzle tip 13, if there is a height deviation of the joint line JL, the moving bracket 33 with the guide pin 21 moves in the upward and downward directions so that the sealant is properly applied.

The floating brake 37 can stop the floating unit 30 from moving when the sealant applying process is completed.

That is, when an end portion of the floating stopper 35 including a brake surface 38 protrudes, it restricts movement of the moving bracket 33 while the brake surface 38 is in close contact with the side plate 33c.

Referring to FIG. 4, the driving unit 40 is configured to rotate the floating unit 30 at a predetermined angle connected thereto.

The driving unit 40 is mounted in correspondence with the floating unit 30 on the other side of the end portion of the arm R of the robot and selectively rotates the floating unit 30 so that the guide pin 21 is brought into close contact with the joint line JL.

The driving unit 40 includes a drive motor 41, a driving rod 45 and a driving brake 49.

The drive motor 41 is mounted inside a driving bracket 43 connected to the end portion of the arm R end of the robot.

For example, the drive motor 41 may be a servo motor.

This drive motor 41 selectively rotates the driving rod 45.

The driving rod 45 is rotatably mounted through a bearing 47 inside the driving bracket 43. The driving rod 45 is provided with a rod bracket 46, and the rod bracket 46 is fitted with the housing 31 of the floating unit 30.

The driving rod 45 is provided with a torsion spring S2, which can restore the position of the driving rod 45.

In an exemplary embodiment of the present invention, an end of the torsion spring S2 is connected to the driving rod 45 and the other end of the torsion spring S2 is connected to the driving bracket 43.

The driving rod 45 may be rotated by the drive motor 41 and then restored to its initial state by the restoring spring S2.

Also, the driving unit 40 may be set to a rotation range through an encoder 100.

Here, the encoder 100 is a well-known element, and a detailed description will be omitted in the present specification.

Furthermore, a driving brake 49 is mounted on the driving bracket 43.

The driving brake 49 is for stopping the driving unit 40 when the sealant applying process is completed.

The driving brake 49 includes a driving stopper 48 which may be selectively protruded, and a friction plate 42 is connected to the driving rod 45.

For example, the driving brake 49 may be in a form of a pneumatic cylinder, selectively protruding the driving stopper 48 to contact with the friction plate 42, locking the driving rod 45. The configuration for transmitting the air pressure to the driving brake 49 is obvious to those skilled in the art and a detailed description thereof will be omitted.

The controller 100 obtains the operating state information related to the drive motor 41 from the encoder 100 to control the operation of the floating brake 37 and the driving brake 49.

The sealant applying device 1 according to exemplary embodiment of the present invention may include a position sensor and the controller may operate the drive motor 41 to control the rotation angle of the floating unit 30 and the guide pin 21 to follow the joint line JL according to the output signals of the position sensor.

The sealant applying device 1 according to the exemplary embodiment of the present invention injects the sealant through the nozzle tip 13 with the guide pin 21 in close contact with the edge portion E of the joint line JL, and thus it is possible to apply sealant uniformly to the joint line JL between the panels P and P2.

Also, even if there is a height deviation of the joint line JL, the guide pin 21 moves upwards and downwards with the moving bracket 33 to enable uniform application of the sealant.

Figure 5:
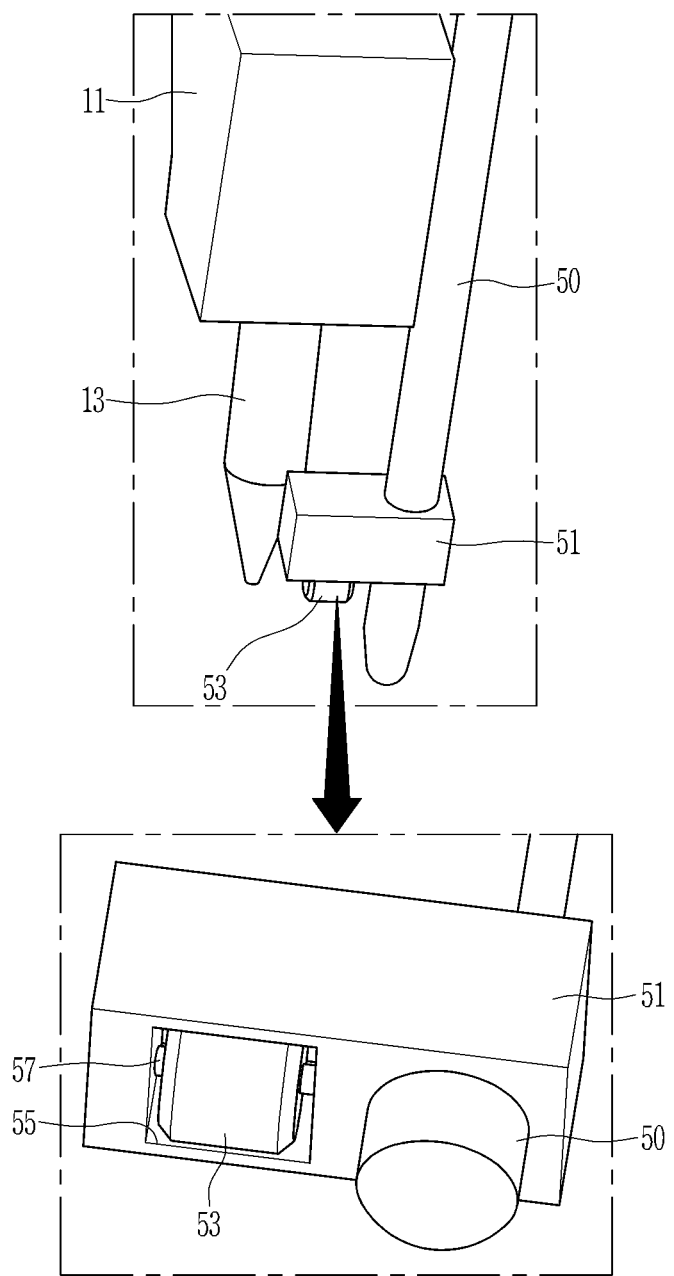
FIG. 5 is a perspective view of a guide unit applied to a sealant applying device according to various exemplary embodiments of the present invention.
Figure 6:
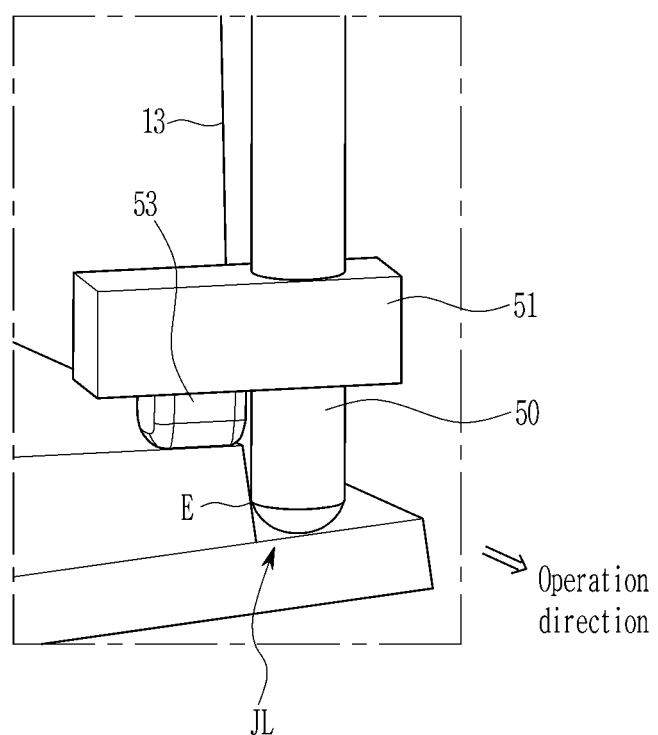
FIG. 6 is a drawing illustrating the operation of a sealant applying device according to various exemplary embodiments of the present invention.

FIG. 5 is a perspective view of a guide unit applied to a sealant applying device according to various exemplary embodiments of the present invention and FIG. 6 is a drawing illustrating the operation of a sealant applying device according to various exemplary embodiments of the present invention.

In the description of the sealer applying device according to various exemplary embodiments of the present invention, description of the same configuration as the sealer applying device according to the exemplary embodiment of the present invention described in FIG. 1, FIG. 2, FIG. 3, and FIG. 4 will be omitted.

Referring to FIG. 5 and FIG. 6, in another exemplary embodiment of the present invention, the guide unit applied to the sealant applying device includes a guide column 50, a guide block 51 and a roller 53.

The guide column 50 is mounted on the fixing block 11.

The guide column 50 is mounted obliquely in the same direction as the nozzle tip 13.

This guide column 50 is contacted at the edge portion E of the joint line JL.

The roller 53 is mounted through a guide block 51 fixed to the guide column 50.

The roller 53 is mounted on the lower side of the guide block 51.

This roller 53 is mounted in a rolling manner movable along the joint line JL together with the guide column 50.

The roller 53 is rotatably coupled through a shaft 57 at a roller groove 55 formed inside the guide block 51.

The roller 53 is protrude from the guide block 51 and is contacted to the panel P1 to guide the movement of the guide column 50.

The roller 53, along with the guide column 50, is positioned in front of the nozzle tip 13 in the direction of operation to guide the nozzle tip 13.

Thus, the sealant applying device according to an another exemplary embodiment of the present invention can apply the sealant to the correct location along the joint line JL regardless of the shape of the joint line JL.

In other words, the sealant applying device can apply the sealant uniformly to the correct position along the joint line JL by applying the sealant while pressing the guide pin or guide column toward the edge portion E side of the joint line JL.

Furthermore, the sealant applying device according to the exemplary embodiments of the present invention can adjust the gap between the panel and the nozzle tip by applying a guide unit so that the application pattern (thickness, width, amount) of the sealant may be kept constant and thus it may be applied regardless of vehicle type.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A sealant applying device for applying a sealant along a joint line formed on a panel joint, the sealant applying device comprising:
   a nozzle device including a nozzle tip mounted through a fixing block to apply the sealant to the joint line;
   a guide unit mounted on a side of the fixing block adjacent to the nozzle tip and configured to be slidably movable along the joint line to guide the nozzle tip;
   a floating unit connected to the fixing block and allowing the fixing block to move in a first direction and a second direction; and
   a driving unit, to which the floating unit is mounted, the driving unit configured to be connected to an arm of a robot and to selectively rotate the floating unit so that the nozzle device is in contact with the joint line,
   wherein the driving unit includes:
      a drive motor mounted within a driving bracket configured to be connected to the arm of the robot;
      a driving rod rotatably mounted within the driving bracket and located between the drive motor and the floating unit to selectively transmit a torque of the drive motor to the floating unit; and
      a driving brake mounted within the driving bracket and selectively locking the driving rod, and
   wherein the driving unit further includes a torsion spring connected to the driving rod and the driving bracket to provide a restoring force on the driving rod.

2. The sealant applying device of claim 1,
   wherein a friction plate is connected to an end of the driving rod, and
   wherein the driving brake includes a driving stopper which is connected to the drive motor and selectively protruded towards the friction plate to contact with the friction plate.

3. The sealant applying device of claim 1,
   wherein the nozzle tip is connected to the fixing block which is slanted to the joint line.

4. The sealant applying device of claim 2,
   wherein the nozzle device further includes a sealant valve which is connected to the nozzle tip via a nozzle tube and supplies the sealant to the nozzle tip.

5. The sealant applying device of claim 1,
   wherein a nozzle tube is mounted through the fixing block.

6. The sealant applying device of claim 1,
   wherein the driving rod is rotatably mounted within the driving bracket through a bearing.

7. The sealant applying device of claim 1,
   wherein the drive motor is a servo motor.

8. The sealant applying device of claim 1,
   wherein the guide unit is located forward of the nozzle tip relative to an operation direction in which the sealant is applied along the joint line.

9. The sealant applying device of claim 1,
   wherein the floating unit is connected to a top portion of the fixing block and configured to guide a movement of the fixing block in upward and downward directions of the fixing block.

10. A sealant applying device for applying a sealant along a joint line formed on a panel joint, the sealant applying device comprising:
    a nozzle device including a nozzle tip mounted through a fixing block to apply the sealant to the joint line;

a guide unit mounted on a side of the fixing block adjacent to the nozzle tip and configured to be slidably movable along the joint line to guide the nozzle tip; and a floating unit connected to the fixing block and allowing the fixing block to move in a first direction and a second direction, wherein the guide unit includes:
- a guide pin mounted through a groove formed in a slanted surface of the fixing block and slanted toward an end portion of the nozzle tip; and
- a fixing bracket fixing the guide pin to the fixing block.

11. The sealant applying device of claim 10, wherein the guide unit further includes:
- a guide column mounted on a side of the fixing block and configured to contact with the joint line;
- a guide block into which the guide column is fitted; and
- a roller mounted at a bottom portion of the guide block and configured for rolling along the joint line.

12. The sealant applying device of claim 11, wherein the roller is rotatably coupled through a shaft inside the guide block.

13. The sealant applying device of claim 10, wherein the nozzle tip is connected to the fixing block which is slanted to the joint line.

14. The sealant applying device of claim 10, wherein a nozzle tube is mounted through the fixing block.

15. A sealant applying device for applying a sealant along a joint line formed on a panel joint, the sealant applying device comprising:
- a nozzle device including a nozzle tip mounted through a fixing block to apply the sealant to the joint line;
- a guide unit mounted on a side of the fixing block adjacent to the nozzle tip and configured to be slidably movable along the joint line to guide the nozzle tip; and
- a floating unit connected to the fixing block and allowing the fixing block to move in a first direction and a second direction, wherein the floating unit includes:
- a housing;
- a moving bracket which is movably mounted within the housing and connected to the fixing block;
- a fixing member mounted on the housing;
- a guide rod connected to the moving bracket and movably inserted into a hole of the fixing member; and
- a spring mounted between the moving bracket and the fixing member.

16. The sealant applying device of claim 15, wherein the moving bracket includes:
- a top plate connected to the guide rod;
- a bottom plate connected to the guide rod; and
- a side plate connecting the top plate and the bottom plate and to which a slot is formed, and wherein the floating unit further includes a floating brake that selectively restricts movement of the moving bracket.

17. The sealant applying device of claim 16, wherein the floating brake includes a floating stopper, and wherein an end of the floating stopper is inserted into the slot and selectively protruded therefrom and a brake surface of the floating brake is configured to selectively contact with the side plate of the moving bracket to limit a movement of the moving bracket.

* * * * *